United States Patent
Ben-Ezra et al.

(10) Patent No.: US 8,677,456 B2
(45) Date of Patent: Mar. 18, 2014

(54) ACCELERATED REEVALUATION OF AUTHORIZATION RULES

(75) Inventors: Asaf Ben-Ezra, Acco (IL); Olga Berezin, Yokneam Ilit (IL); Haim Schneider, Ramot Meir (IL); Ofira Tal-Aviv, Moshav Bitzaron (IL); Asaf Zinger, Givat Shmuel (IL)

(73) Assignee: International Business Machines Corporation, Armonk, NY (US)

( * ) Notice: Subject to any disclaimer, the term of this patent is extended or adjusted under 35 U.S.C. 154(b) by 1329 days.

(21) Appl. No.: 11/972,378

(22) Filed: Jan. 10, 2008

(65) Prior Publication Data

US 2009/0183236 A1    Jul. 16, 2009

(51) Int. Cl.
   *H04L 29/06*    (2006.01)

(52) U.S. Cl.
   USPC ............................................................. 726/4

(58) Field of Classification Search
   USPC ............................................................. 726/4
   See application file for complete search history.

(56) References Cited

U.S. PATENT DOCUMENTS

| | | | |
|---|---|---|---|
| 2001/0038624 A1* | 11/2001 | Greenberg et al. | 370/352 |
| 2003/0104819 A1* | 6/2003 | Knauerhase et al. | 455/456 |
| 2005/0122962 A1* | 6/2005 | Delaney et al. | 370/352 |
| 2005/0152527 A1* | 7/2005 | Kent et al. | 379/211.02 |
| 2006/0047742 A1* | 3/2006 | O'Neill et al. | 709/203 |
| 2007/0121867 A1* | 5/2007 | Ozugur et al. | 379/201.1 |
| 2008/0285735 A1* | 11/2008 | Ravishankar et al. | 379/207.02 |

FOREIGN PATENT DOCUMENTS

WO    WO 2005/004349 A2 *    1/2005

OTHER PUBLICATIONS

H. Schulzrinne, et al.; "Common Policy: A Document Format for Expressing Privacy Preferences"; RFC 4745 Internet Engineering Task Force; Feb. 2007; pp. 1-32.

* cited by examiner

*Primary Examiner* — William Goodchild
(74) *Attorney, Agent, or Firm* — Sughrue Mion, PLLC

(57) ABSTRACT

A method for evaluating authorization rules, the method including evaluating a plurality of authorization rules in connection with an authorization process for a subject, storing in a computer-readable storage medium and in association with the subject a rule identifier of any of the rules that are applicable to the subject, and performing, in connection with a subsequent authorization process for the subject, a computer-based action indicated by any of the rules identified by any of the stored rule identifiers, where the performing step is performed independent from an evaluation of the applicability of any of the authorization rules in connection with the subsequent authorization process.

20 Claims, 8 Drawing Sheets

ACCELERATED REEVALUATION OF AUTHORIZATION RULES

FIELD OF THE INVENTION

The present invention relates to computer networks in general, and more particularly to providing information to networked entities regarding the status of other networked entities.

BACKGROUND OF THE INVENTION

The Session Initiation Protocol (SIP) is a protocol for creating, modifying, and terminating computer network-based communication sessions, such as for an Internet-based telephone call between two or more participants. Since its introduction numerous enhancements to SIP have been proposed, including the SIP Instant Messaging and Presence Leveraging Extensions (SIMPLE) framework in which one or more network entities, such as computer users, create subscriptions on a server, known as a "presence" server, to receive presence information regarding another network entity, referred to as a "presentity." When a change in the presentity's presence information is detected, such as when the presentity "publishes" such a change to the presence server, SIP is used to send a notification to the subscribers regarding the change.

Another enhancement allows for authorization rules to be created to enable presence servers to determine whether subscribers to a presentity's presence information, referred to as "watchers," are permitted to receive such information, and, if so, what aspects of the presentity's presence information they may receive. The authorization rules for a presentity, such as are defined in RFC 4745 and draft-ietf-simple-presence-rules-10 of the Internet Engineering Task Force (IETF), typically includes a <ruleset> element that may contain multiple <rule> elements. Each <rule> may have one or more <conditions>, <actions>, and <transformations> elements, where a <conditions> element defines conditions that need to be met before executing the remaining parts of a rule, such as conditions based on the identity of the subscriber, the <actions> element indicates whether the subscription should be allowed or blocked, and the <transformations> element specifies operations that presence server must execute for modifying the presence document that is returned to the subscriber. For example, the <transformations> element may include specific permission elements that define what presence attributes may be provided to the subscriber.

The evaluation of authorization rules typically involves the following steps:
Retrieving the authorization rules of the subscribed presentity, such as from an XML Document Management Server (XDMS) where the authorization rules are stored as an XML document;
Parsing the authorization rules;
Evaluating the <conditions> of each rule to determine if the rule applies to the subscription request;
Determining the <action> to be taken where a rule applies to the subscription. If more than one rule applies to the subscriber, determining a combined action to be taken;
Evaluating the <transformations> indicated by each applicable rule. If more than one rule is applicable, determining a combined transformation;
Filtering the presence information of the subscribed presentity according to the applicable transformation/combined transformations.

A presence server typically evaluates the authorization rules when a request to create, renew, or cancel a subscription is received, as well as before sending any notification to a subscriber, such as when there is a change in the presence information of the subscribed resource. These steps involve resource-heavy tasks, such as database access, communication with another server, XML parsing, and XML manipulation. The evaluation of authorization rules is therefore a major bottleneck for a presence server, resulting in reduced capacity of the number of subscriptions a single server can handle, as well as increased response latency. Systems and/or methods for more efficient application of authorization rules would therefore be advantageous.

SUMMARY OF THE INVENTION

The present invention in embodiments thereof discloses novel systems and methods for reducing resource requirements stemming from authorization rules evaluation.

In one aspect of the present invention a method is provided for evaluating authorization rules, the method including evaluating a plurality of authorization rules in connection with an authorization process for a subject, storing in a computer-readable storage medium and in association with the subject a rule identifier of any of the rules that are applicable to the subject, and performing, in connection with a subsequent authorization process for the subject, a computer-based action indicated by any of the rules identified by any of the stored rule identifiers, where the performing step is performed independent from an evaluation of the applicability of any of the authorization rules in connection with the subsequent authorization process.

BRIEF DESCRIPTION OF THE DRAWINGS

The present invention in embodiments thereof will be understood and appreciated more fully from the following detailed description taken in conjunction with the appended drawings in which.

DETAILED DESCRIPTION OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1A:
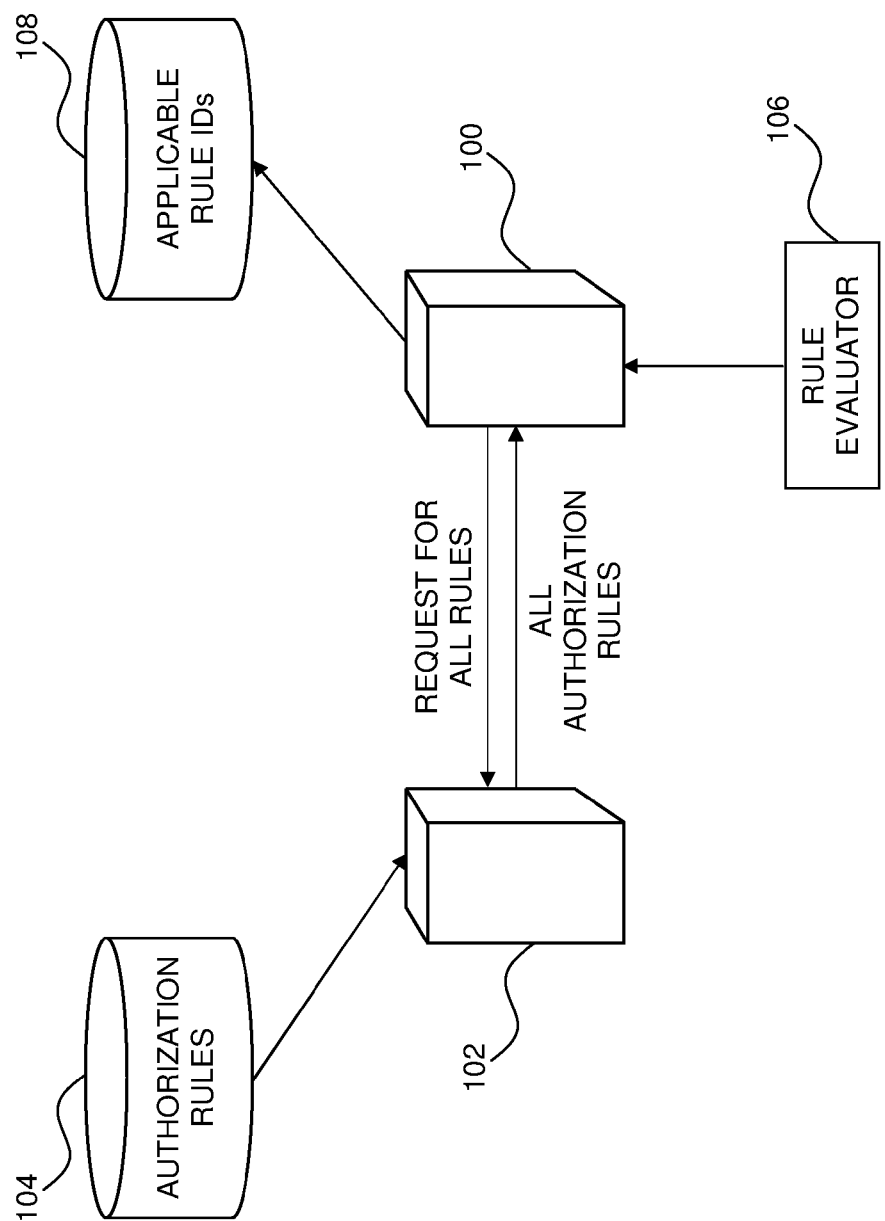
FIG. 1A is a simplified illustration of an authorization rule evaluation system, constructed and operative in accordance with an embodiment of the present invention.
Figure 2A:
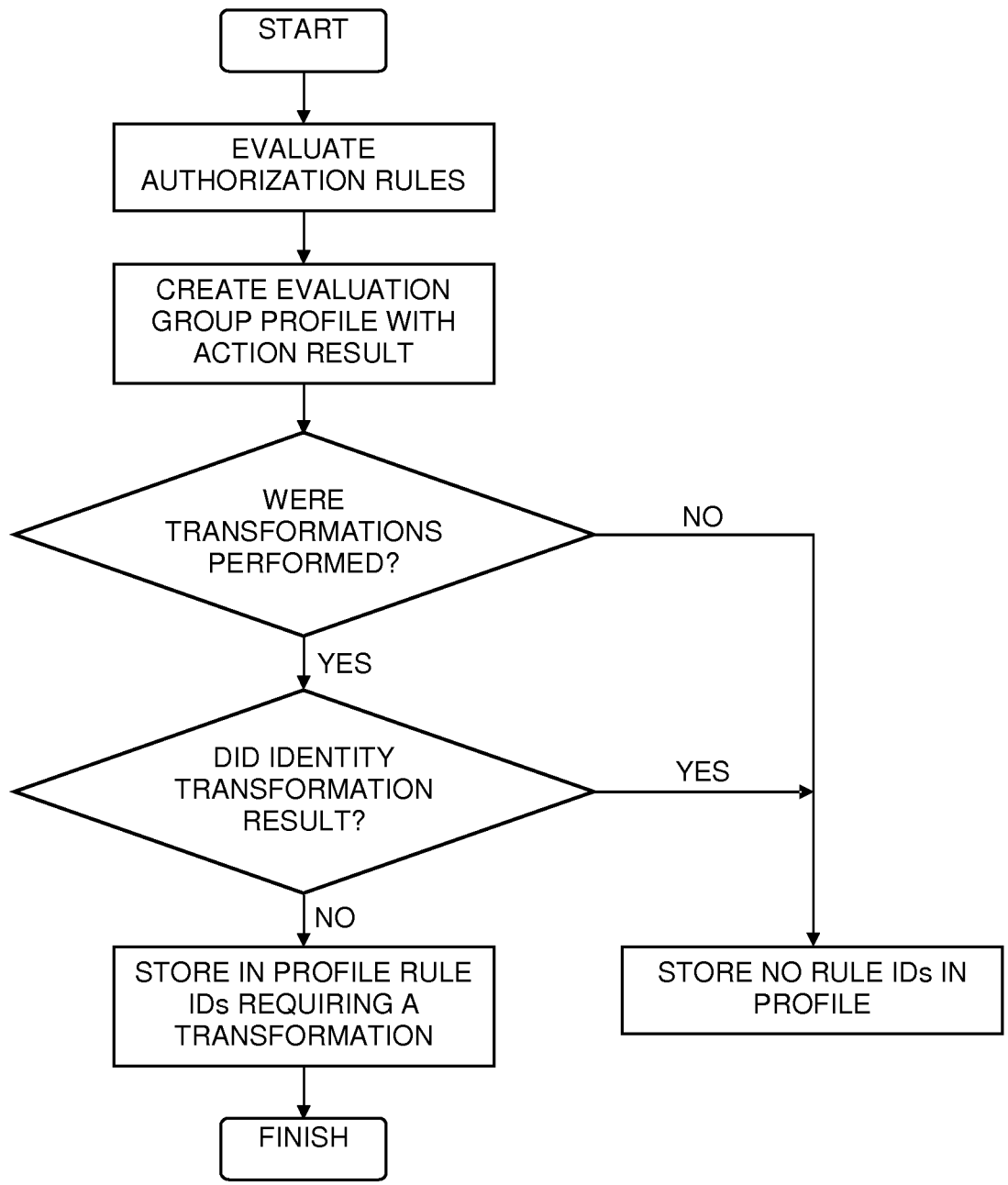
FIG. 2A is a simplified flowchart illustration of an exemplary method of operation of the system of FIG. 1a, operative in accordance with an embodiment of the invention.

Reference is now made to FIG. 1A, which, is a simplified illustration of an authorization rule evaluation system, constructed and operative in accordance with an embodiment of the present invention, and additionally to FIG. 2A, which is a simplified flowchart illustration of an exemplary method of operation of the system of FIG. 1A, operative in accordance with an embodiment of the invention. In the system of FIG. 1A and method of FIG. 2A, an authorizer 100, such as a SIP/SIMPLE presence server, requests authorization rules from an authorization rules holder 102, such as an XDMS server. In various embodiments the request for authorization rules is made in response to authorizer 100 receiving a request to create, renew, or cancel a subscription for presence information relating to a presentity, or before sending any notification to a subscriber, such as when there is a change in the presence information of the presentity. In these embodiments the subject for which an authorization process is performed is the subscriber in the context of a subscription. Authorization rules are typically predefined for one or more presentities in accordance with conventional techniques and maintained, such as in a data store 104, which may be any computer-readable storage medium. Thus, authorizer 100 typically requests the authorization rules associated with a particular presentity, such as the presentity which is the subject of a subscription request. Authorization rules holder 102 responds by providing authorizer 100 with the authorization rules, typically in the form of an XML-based rule set document. Authorizer 100 typically also creates a subscription with authorization rules holder 102 to be notified whenever there is a change in presence authorization rules of the presentity.

Authorizer 100 typically includes, or has access to, a rule evaluator 106 which evaluates the authorization rules in accordance with conventional techniques. For example, SIP/SIMPLE authorization rules are evaluated as described above, first by evaluating the <conditions> elements of each rule to determine if the rule applies to the subscriber regarding whom the rules are being evaluated. Rule evaluator 106 then determines which <actions> is to be taken given each rule that applies to the subscriber. The <transformations> indicated by each rule that applies to the subscriber are then evaluated to determine if and how the presentity's presence information should be filtered prior to sending a notification of the presence information to the subscriber.

Once the authorization rules have been evaluated, rule evaluator 106 creates in a data store 108, which may be any computer-readable storage medium, an evaluation group profile identified by an evaluation group identifier that will be used to identify a group of multiple instances of evaluating the authorization rules for the same entity for which authorization is being requested. For example, a SIP session ID for a SIP/SIMPLE subscription may be used as an evaluation group identifier, such that every time authorizer 100 wishes to evaluate the authorization rules for the same subscription, any information maintained by rule evaluator 106 for the subscription may be retrieved from data store 108 using the subscription's SIP session ID.

Rule evaluator 106 also preferably stores the action result of the authorization rules evaluation in data store 108 together with the evaluation group identifier. For example, when a SIP/SIMPLE subscription request is allowed, rule evaluator 106 stores "allow" in data store 108, and stores "block," "polite block," or "confirm" when it is not. If the action result indicates that further actions need to be taken, the rule identifiers of any applicable rules requiring such action are also preferably stored by rule evaluator 106 in data store 108 together with the evaluation group identifier. This is the case, for example, when a SIP/SIMPLE subscription request is allowed, and one or more applicable rules have <transformations> that need to be applied prior to sending presence information to the subscriber. If the action result indicates that no further actions need to be taken, no rule identifiers need be stored. Furthermore, if the actions to be taken have no net effect, such as where the transformations applied to a presentity's presence information as stored in an XML document collectively result in an "identity transformation" where the entire document being sent to the subscriber unchanged and in its entirety, no rule identifiers need be stored. This may occur, for example, if the combination of all <transformations> elements from all applicable rules contains specific permission elements that collectively allow the subscriber to receive all possible presence attributes, the net effect being that the entire presence document is to be provided to the subscriber.

Figure 1B:
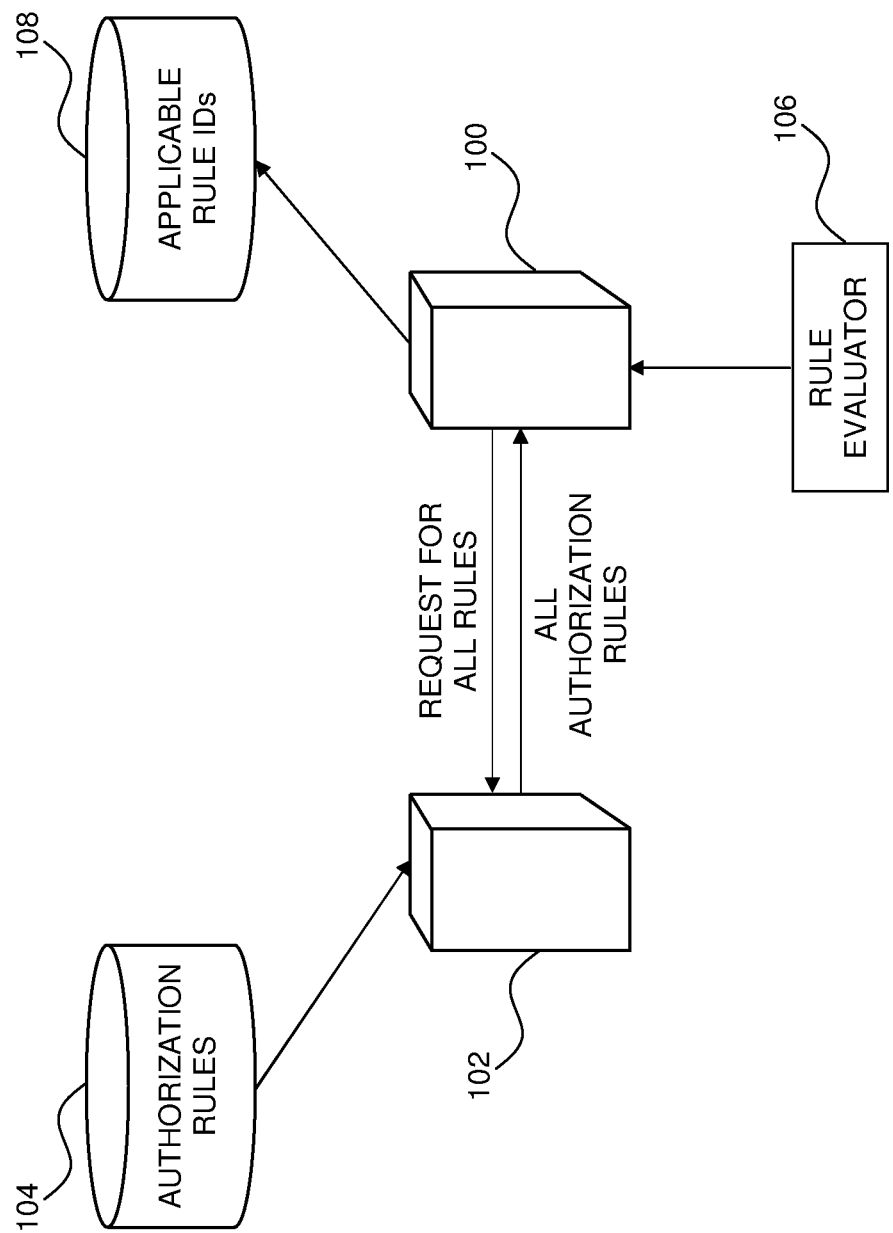
FIG. 1B is a simplified illustration of an authorization rule evaluation system, constructed and operative in accordance with an embodiment of the present invention.
Figure 2B:
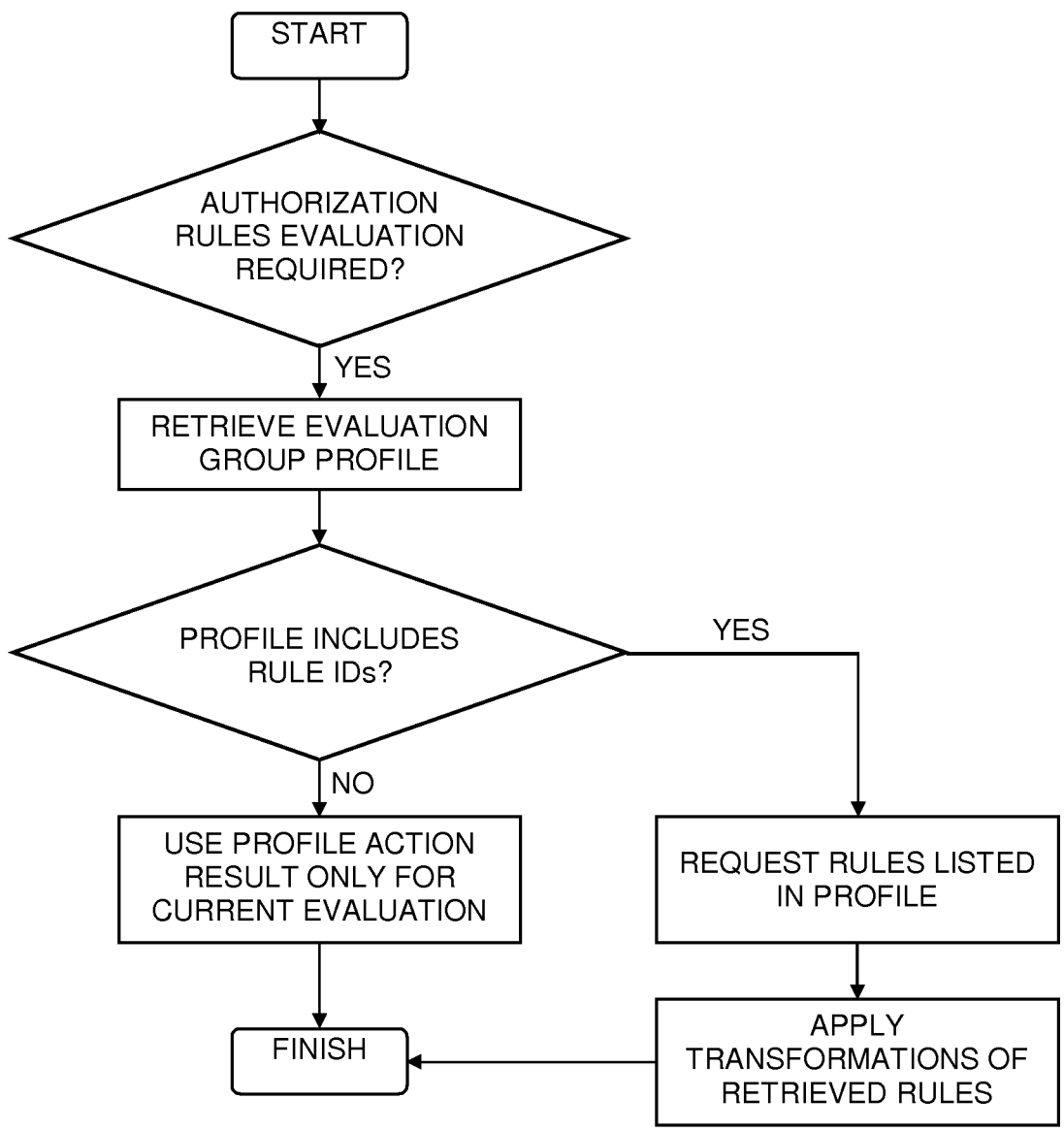
FIG. 2B is a simplified flowchart illustration of an exemplary method of operation of the system of FIG. 1B, operative in accordance with an embodiment of the invention.

Reference is now made to FIG. 1B, which, is a simplified illustration of an authorization rule evaluation system, constructed and operative in accordance with an embodiment of the present invention, and additionally to FIG. 2B, which is a simplified flowchart illustration of an exemplary method of operation of the system of FIG. 1B, operative in accordance with an embodiment of the invention. In the system of FIG. 1B and method of FIG. 2B, once the authorization rules for a presentity have been evaluated for a subscription as described hereinabove, subsequent requests to evaluate the same authorization rules for a subscription may be serviced by evaluating only a subset of the authorization rules, or without evaluating any of the authorization rules. This is done by retrieving the evaluation group profile associated with the subscription, such as by using the subscription's SIP session ID in the case of a SIP/SIMPLE subscription. If the stored action result indicates that no rules need be evaluated, such as where the action result for a SIP/SIMPLE subscription is anything other than "allow", or the action result is "allow" but the presence information is to be provided as is, and therefore the evaluation group profile includes no rule identifiers, the stored action result is used to satisfy the current authorization rules evaluation request without evaluating any authorization rules.

If the action result indicates that authorization rules need to be evaluated, such as where the action result for a SIP/SIMPLE subscription is "allow" and one or more rule identifiers are stored as part of the evaluation group profile, authorizer 100 preferably requests the presentity's authorization rules from authorization rules holder 102, but applies <transformations> only for those rules whose identifiers are stored as part of the evaluation group profile. Alternatively, authorizer 100 requests only those rules whose rule identifiers are stored as part of the evaluation group profile. Where authorization rules holder 102 is an XDMS server, this may be accomplished using XPath statements to retrieve the applicable rules. In any case, there is no need to evaluate the <conditions> of these rules, as it is already known that they apply to the subscription.

Figure 3:
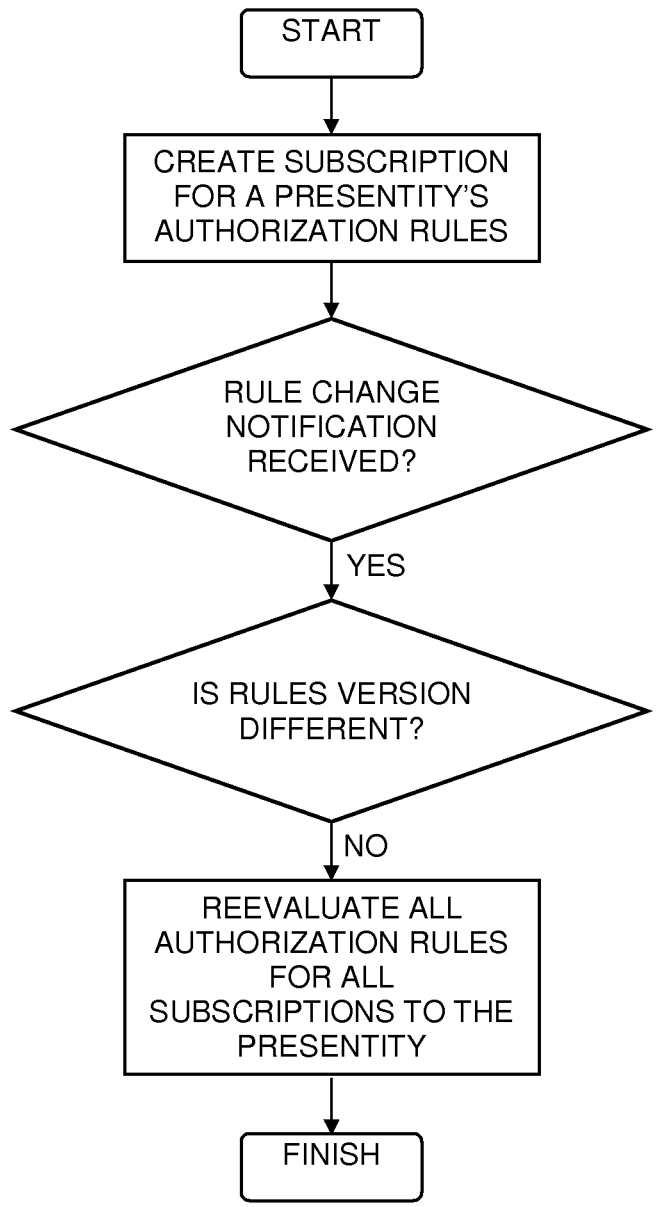
FIG. 3 is a simplified flowchart illustration of an exemplary method of operation of the system of FIGS. 1A and 1B, operative in accordance with an embodiment of the invention.

Reference is now made to FIG. 3, which, is a simplified flowchart illustration of an exemplary method of operation of the system of FIGS. 1A and 1B, operative in accordance with an embodiment of the invention. In the method of FIG. 3, any of the stored evaluation group profiles described above becomes invalid if the related authorization rules of a presentity change. In one embodiment authorizer 100 determines that such a change has occurred by itself creating a subscription at authorization rules holder 102 for the presentity's authorization rule set document. When authorizer 100 receives a notification from authorization rules holder 102 of a change in the presentity's authorization rules, or when such a change is otherwise detected, rule evaluator 106 preferably reevaluates all of the authorization rules for all the subscriptions to the presentity to which the authorization rules apply and sends updated notifications to the subscribers. The reevaluation is preferably performed as described hereinabove with reference to FIGS. 1A and 2A. In order to ensure that the reevaluation is only performed when an actual change is made to a set of authorization rules, rule evaluator 106 preferably stores a version indicator of the authorization rules that it last fully evaluated, such as an eTag associated with the rule set document. When authorizer 100 receives a notification of a change to the authorization rules, rule evaluator 106 preferably compares its stored version indicator with the version indicator of the authorization rules that it receives as part of the notification. If the version indicators are the same, then the authorization rules need not be reevaluated.

Figure 4:
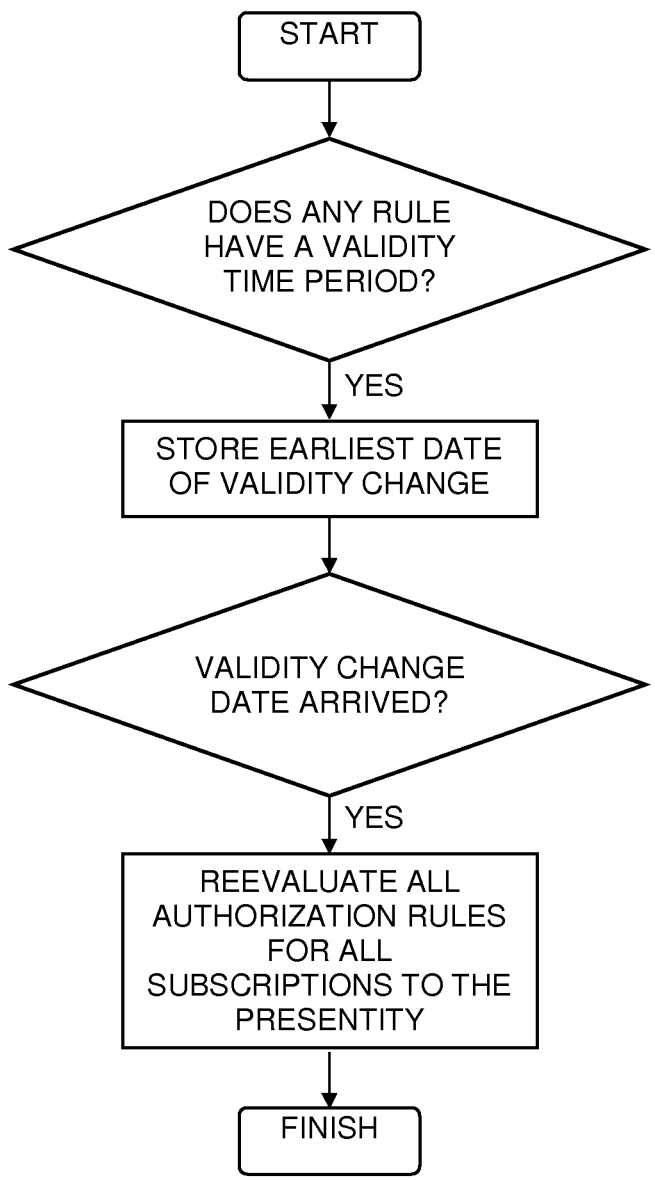
FIG. 4 is a simplified flowchart illustration of an exemplary method of operation of the system of FIGS. 1A and 1B, operative in accordance with an embodiment of the invention.

Reference is now made to FIG. 4, which, is a simplified flowchart illustration of an exemplary method of operation of the system of FIGS. 1A and 1B, operative in accordance with an embodiment of the invention. In the method of FIG. 4, any authorization rule may have a <validity> element indicating a time period during which the rule is valid. If such a <validity> element exists for any authorization rule evaluated by rule evaluator 106, rule evaluator 106 preferably stores the earliest date on which any of the authorization rules becomes invalid or valid. When the date arrives, rule evaluator 106 preferably reevaluates all of the authorization rules for all the subscriptions to the presentity to which the authorization rules apply and sends updated notifications to the subscribers. The reevaluation is preferably performed as described hereinabove with reference to FIGS. 1A and 2A.

Figure 5:
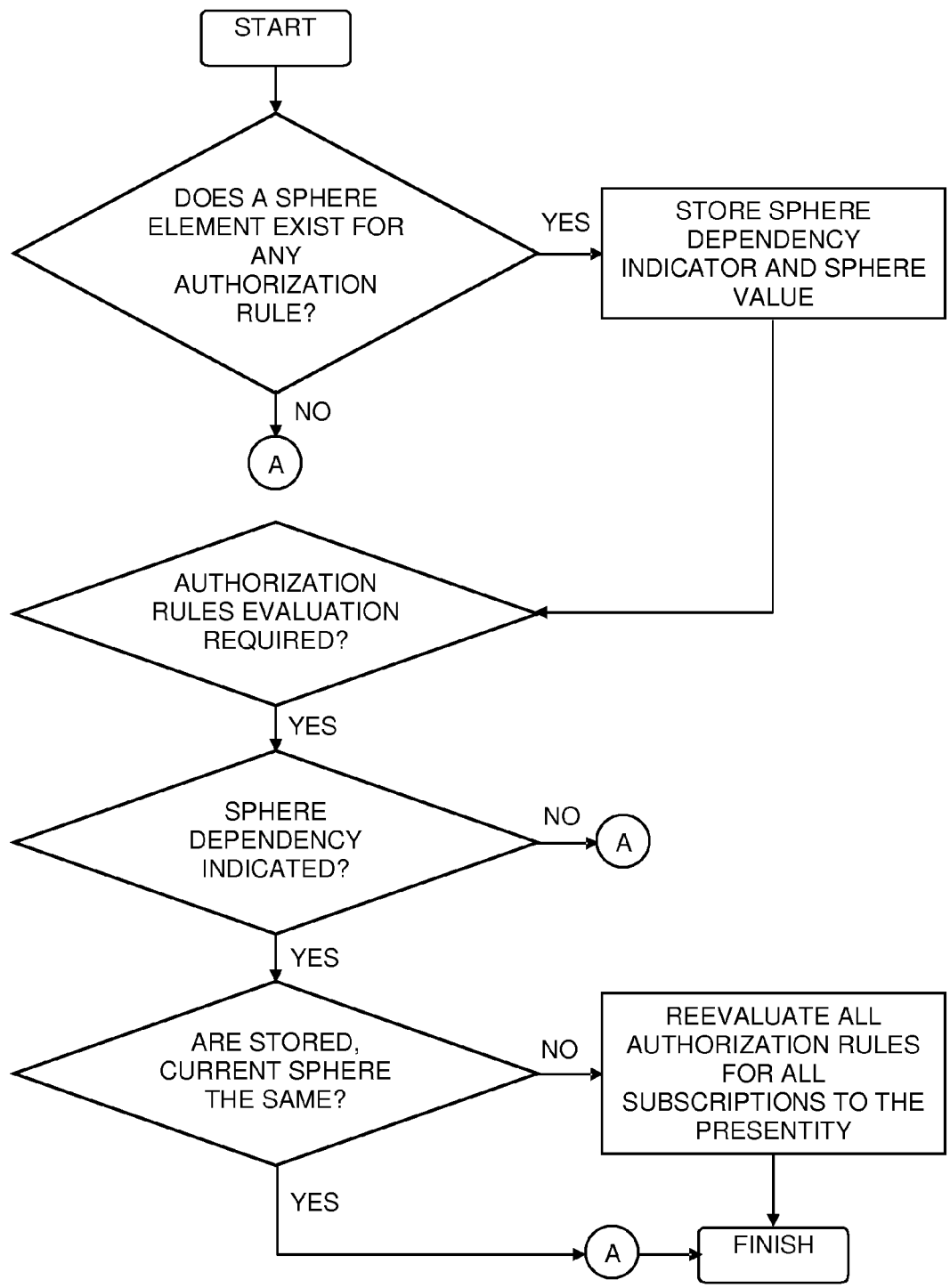
FIG. 5 is a simplified flowchart illustration of an exemplary method of operation of the system of FIGS. 1A and 1B, operative in accordance with an embodiment of the invention.

Reference is now made to FIG. 5, which, is a simplified flowchart illustration of an exemplary method of operation of the system of FIGS. 1A and 1B, operative in accordance with an embodiment of the invention. In the method of FIG. 5, any authorization rule may have a <sphere> element that specifies the value of a sphere attribute for which the rule is valid. A sphere is general state indicator that appears in a presence document (e.g., "work," "home," "meeting," "travel"). When included in the <conditions> part of an authorization rule, the <sphere> element indicates a context for the rule. For example, if the rule includes a <sphere> element with the value "work," the rule is only applied if, according to the presentity's current presence document, his sphere is "work." If the sphere of the presentity changes, different authorization rules may apply, and any related evaluation group profiles are no longer valid. Thus, if such a <sphere> element exists for any authorization rule evaluated by rule evaluator 106, rule evaluator 106 preferably stores an indicator that sphere dependency is in effect for the presentity, as well as the value of the <sphere> element when the presence rules were last fully evaluated. When a request is made to evaluate the authorization rules, if sphere dependency is indicated the current sphere of the presentity is queried and compared to the stored sphere value. If the sphere has changed, rule evaluator 106 preferably reevaluates all of the authorization rules for all the subscriptions to the presentity to which the authorization rules apply and sends updated notifications to the subscribers. The reevaluation is preferably performed as described hereinabove with reference to FIGS. 1A and 2A.

Figure 6:
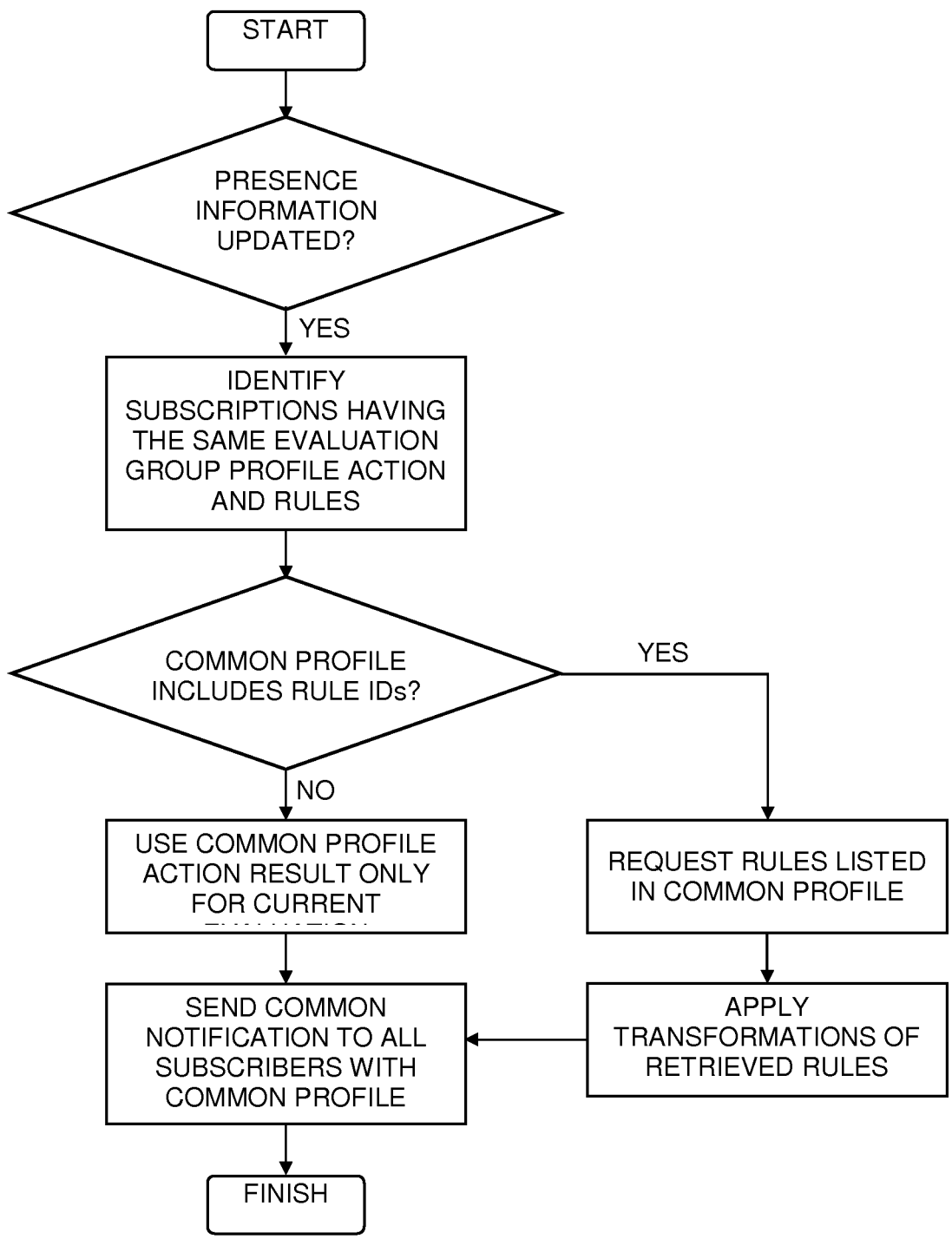
FIG. 6 is a simplified flowchart illustration of an exemplary method of operation of the system of FIGS. 1A and 1B, operative in accordance with an embodiment of the invention.

Reference is now made to FIG. 6, which, is a simplified flowchart illustration of an exemplary method of operation of the system of FIGS. 1A and 1B, operative in accordance with an embodiment of the invention. In the method of FIG. 6, when a new/updated presence document is published by a presentity, notifications must typically be sent to all subscribers to the presentity, requiring that the authorization rules be evaluated for each subscription to the presentity. By applying the methods described hereinabove, the presence server may avoid the retrieval and evaluation of some or all of the authorization rules. In the present embodiment, a further efficiency may be realized by identifying those subscriptions that have the same action result and rule identifiers listed in their evaluation group profiles, applying any applicable authorization rules only once for all the identified subscribers, and sending the resulting notification of presence information to the identified subscribers. Thus, instead of evaluating rules multiple times for multiple subscriptions, applicable rules may be evaluated once for each group of subscriptions for which the same rules apply, and applicable transformations may likewise be applied only once for each group.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A method for evaluating authorization rules, the method comprising:
    evaluating a plurality of authorization rules in connection with an authorization process for a subject;
    storing, in a non-signal computer-readable storage medium and in association with said subject, a result of the evaluating the plurality of authorization rules and a rule identifier of any of said authorization rules that are applicable to said subject and are associated with the result; and
    performing, by a processor, in connection with a subsequent authorization process for said subject, a computer-based action indicated by the stored result of evaluation of the plurality of authorization rules associated with any of said authorization rules identified by any of said stored rule identifiers,
    wherein said performing operation is performed independent from an evaluation of the applicability of any of said authorization rules in connection with said subsequent authorization process.

2. The method according to claim 1 wherein said storing operation comprises storing, based on the result of the evaluating the plurality of authorization rules, a rule identifier of any of said authorization rules that are applicable to said subject that requires an action to be performed; and
    storing the action to be performed for each of the rule identifier.

3. The method according to claim 1 wherein said storing operation comprises storing said rule identifiers only if actions that are indicated by said applicable rules result in a net transformation of data when all of said actions are performed.

4. The method according to claim 1 and further comprising performing storing an action result for said subject after evaluating said authorization rules.

5. The method according to claim 4 and further comprising and further comprising using said stored action result for said subject during said subsequent authorization process.

6. The method according to claim 1 wherein said evaluating step comprises evaluating a SIP/SIMPLE subscription of a subscriber requesting the presence information of a presentity, and wherein said authorization rules are predefined for said presentity.

7. The method according to claim 6 wherein said evaluating operation comprises:
- evaluating any <conditions> elements of any of said authorization rules to determine if said rule applies to said subscriber;
- determining which <actions> elements of any of said applicable rules is to be taken; and
- evaluating any <transformations> elements of any of said applicable rules to determine if and how said presentity's presence information should be filtered prior to sending a notification of said presence information to said subscriber.

8. The method according to claim 6 wherein said storing operation comprises storing a SIP session ID of said subscription in association with said rule identifiers.

9. The method according to claim 1 and further comprising requesting from an authorization rules holder, and in connection with said subsequent authorization process for said subject, any of said authorization rules identified by any of said stored rule identifiers.

10. The method according to claim 1 and further comprising receiving a notification of a change in said authorization rules, and reperforming said evaluating and storing operations responsive to said change.

11. The method according to claim 10 and further comprising storing a version indicator of said evaluated authorization, comparing said stored version indicator with a version indicator received as part of said notification, and performing said reperforming step only if said version indicators are different.

12. The method according to claim 1 and further comprising storing a date associated with any of said authorization rules, and reperforming said evaluating and storing operations responsive to the arrival of said date.

13. The method according to claim 12 wherein said date corresponds to either of a valid date and an invalid date of any of said authorization rules.

14. The method according to claim 1 and further comprising storing a sphere value indicating a current sphere in effect at the time of said evaluation and on which any of said authorization rules rely, and reperforming said evaluating and storing operations responsive to a change in said sphere.

15. The method according to claim 1 and further comprising composing a notification for said subject by applying any actions of any authorization rules identified by said rule identifiers, and sending said notification to said subject and any other subjects for whom the same rule identifiers are stored.

16. A system for evaluating authorization rules, the system comprising:
- a rule evaluator configured to evaluate a plurality of authorization rules in connection with an authorization process for a subject; and
- an authorizer configured to:
- store, in a non-signal computer-readable storage medium and in association with said subject, a result of the evaluating the plurality of authorization rules and a rule identifier of any of said authorization rules that are applicable to said subject and are associated with the result, and
- perform, by a processor, in connection with a subsequent authorization process for said subject, a computer-based action indicated by the stored result of evaluation of the plurality of authorization rules associated with any of said authorization rules identified by any of said stored rule identifiers, wherein said authorizer is configured to perform said actions independent from an evaluation of the applicability of any of said authorization rules in connection with said subsequent authorization process.

17. The system according to claim 16 wherein said authorizer is configured to store, based on the result of the evaluation of the plurality of authorization rules, a rule identifier of any of said authorization rules that are applicable to said subject that requires an action to be performed; and
- store the action to be performed for each of the rule identifier.

18. The system according to claim 16 wherein said authorizer is configured to store said rule identifiers only if actions that are indicated by said applicable rules result in a net transformation of data when all of said actions are performed.

19. The system according to claim 16 wherein said authorizer is configured to store an action result for said subject after evaluating said authorization rules.

20. A computer program embodied on a non-signal computer-readable medium, the computer program comprising:
- a first code segment operative to evaluate a plurality of authorization rules in connection with an authorization process for a subject;
- a second code segment operative to store, in a computer-readable storage medium and in association with said subject, a result of the evaluating the plurality of authorization rules and a rule identifier of any of said authorization rules that are applicable to said subject and are associated with the result; and
- a third code segment operative to perform, in connection with a subsequent authorization process for said subject, a computer-based action indicated by the stored result of evaluation of the plurality of authorization rules associated with any of said authorization rules identified by any of said stored rule identifiers,
- wherein said third code segment is operative to perform said action independent from an evaluation of the applicability of any of said authorization rules in connection with said subsequent authorization process.

* * * * *